United States Patent
Kothari et al.

(10) Patent No.: US 8,452,352 B2
(45) Date of Patent: May 28, 2013

(54) SYSTEMS AND METHODS FOR PREDICTING BATTERY DRAIN TIME CAUSED BY SMARTPHONE APPLICATIONS

(75) Inventors: Ravi Kothari, New Delhi (IN); Vijay Mann, Gurgaon (IN); Raghavendra Singh, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 12/613,566

(22) Filed: Nov. 6, 2009

(65) Prior Publication Data

US 2011/0111799 A1   May 12, 2011

(51) Int. Cl.
*H01Q 11/12* (2006.01)
*H04B 1/04* (2006.01)
*H04B 1/16* (2006.01)
*H04M 1/00* (2006.01)

(52) U.S. Cl.
USPC ............. 455/574; 455/127.5; 455/343.1

(58) Field of Classification Search
USPC ............. 455/414.1, 414.2, 418, 423, 424, 455/425, 432.3, 67.11, 550.1, 572, 574, 127.5, 455/343.1, 343.2, 343.4, 343.5, 344; 370/311; 379/433.08
See application file for complete search history.

(56) References Cited

U.S. PATENT DOCUMENTS

| | | | |
|---|---|---|---|
| 7,719,987 B2* | 5/2010 | Kobayashi et al. | 370/238 |
| 7,967,212 B1* | 6/2011 | Euler et al. | 235/472.01 |
| 2006/0217152 A1* | 9/2006 | Fok et al. | 455/557 |
| 2008/0261662 A1* | 10/2008 | Ashbrook et al. | 455/572 |
| 2009/0006878 A1 | 1/2009 | Borghetti et al. | |
| 2009/0251326 A1* | 10/2009 | Kim et al. | 340/636.1 |
| 2010/0114510 A1* | 5/2010 | Vaingast | 702/62 |
| 2010/0138174 A1* | 6/2010 | Archibald et al. | 702/60 |
| 2010/0178961 A1* | 7/2010 | Book et al. | 455/572 |
| 2010/0216521 A1* | 8/2010 | Wu et al. | 455/572 |
| 2010/0233989 A1* | 9/2010 | Constien et al. | 455/343.1 |

FOREIGN PATENT DOCUMENTS

EP   1887815 A1   2/2008

* cited by examiner

*Primary Examiner* — Andrew Wendell
(74) *Attorney, Agent, or Firm* — Brevetto Law Group

(57) ABSTRACT

Predicting battery drain time that would be caused by a new application being considered for a smartphone. The battery drain time prediction is based on the type of smartphone and type of battery, the battery age, and hardware subunit usage levels. The system may provide a watchdog service for monitoring and storing data of user's smartphone which may then be used to create a user profile. Upon receiving a request for a battery drain time prediction, the system matches the profile of the user's smartphone with an existing profile in the repository having pre-installation and post-installation data for the application being considered. The matching user profile can be used to predict battery drain time that will be caused by the new application.

20 Claims, 5 Drawing Sheets

SYSTEMS AND METHODS FOR PREDICTING BATTERY DRAIN TIME CAUSED BY SMARTPHONE APPLICATIONS

BACKGROUND

1. Field of the Invention

The present invention relates to batteries for consumer electronic devices, and more specifically, to systems, methods and computer products for predicting battery drain time caused by an application on a smartphone.

2. Description of Related Art

Smartphones have become increasingly popular in recent years. Smartphones not only have the capabilities of making calls but also allow applications to be installed and executed. Examples of such smartphones include Apple's iPhone as well as models from Nokia and Motorola, and other similar smartphone devices. Smartphone have been developed with a number of operating systems (OS), including Windows based smartphones, Android based smartphones and Symbian based smartphones. As the popularity of such phones increases, more smartphone applications have become available as well. Applications available for smartphones include games, utilities like calendars, business applications, applications that render certain websites in a particular way on a given smartphone, e.g., the Facebook and NYTimes applications for iPhone.

Battery management is one of the critical issues with smartphones. Over the years there has been substantial improvement in battery management with respect to the basic functionality of making calls. Thus, GSM/CDMA technology uses only a fraction of the power per unit time than the early mobile telephone handsets. On the other hand, the new smartphones have not been optimized for running the increasingly sophisticated applications mentioned above. Upon being executed these applications perform a number of operations, accessing different modules in the smartphone, for example they access the net through WLAN, or use graphics card for rendering games, or allow communication between devices using Bluetooth, or various combinations of these activities. Smartphone applications perform a number of operations and interface with various hardware devices causing the phone's battery to drain much faster than it would if used solely for making calls over the cellular network.

The present inventors realized that what is needed is an improved system for smartphone power management that monitors and predicts the battery drain time that would be caused by loading a new application on to the smartphone.

SUMMARY

Embodiments disclosed herein address the above stated needs by providing systems, methods and computer products that take into account the type of smartphone and battery, the battery age, and the user's smartphone usage profile to predict the battery drain time caused by loading an application of interest on to the smartphone. Various embodiments achieve this by determining type of the smartphone and its battery type. The system also determines the battery age. It also determines the various hardware subunit usage levels. The system selects a matching user profile by comparing the type of smartphone, the determined hardware subunit usage levels, the battery type and the determined battery age to a plurality of user profiles in a user profile repository. The user profile repository includes pre-installation battery drain time and post-installation battery drain time for the application of interest. The system then creates a battery drain time prediction for the application based on the pre-installation battery drain time and the post-installation battery drain time of the selected matching user profile. The battery drain time prediction is created before loading the application on to the smartphone.

BRIEF DESCRIPTION OF THE DRAWINGS

The accompanying drawing, which is incorporated in and constitutes part of the specification, illustrate various embodiments of the invention. Together with the general description, the drawings serve to explain the principles of the invention. In the drawings.

DETAILED DESCRIPTION

The various embodiments disclosed herein involve systems and methods that can be used to predict the battery drain time caused by a software application being considered for installation on either a smartphone or on another such portable electronic device. Battery drain time is the time taken for the battery to drain from full charge to a cut-off charge at which the device stops functioning. The battery drain time prediction can be based on the user's own usage patterns, the device settings and subunit configurations of the smartphone, and the type and age of the smartphone's battery. This fills a need to determine the impact of a smartphone application with respect to battery life. Conventional mechanisms for predicting power consumption of smartphone applications do not take into account the battery type and age, the user's usage patterns, or the smartphone subunit configuration. Various embodiments disclosed herein overcome this disadvantage through the use of a unique user profile that considers the various factors affecting battery drain of the smartphone.

Figure 1:
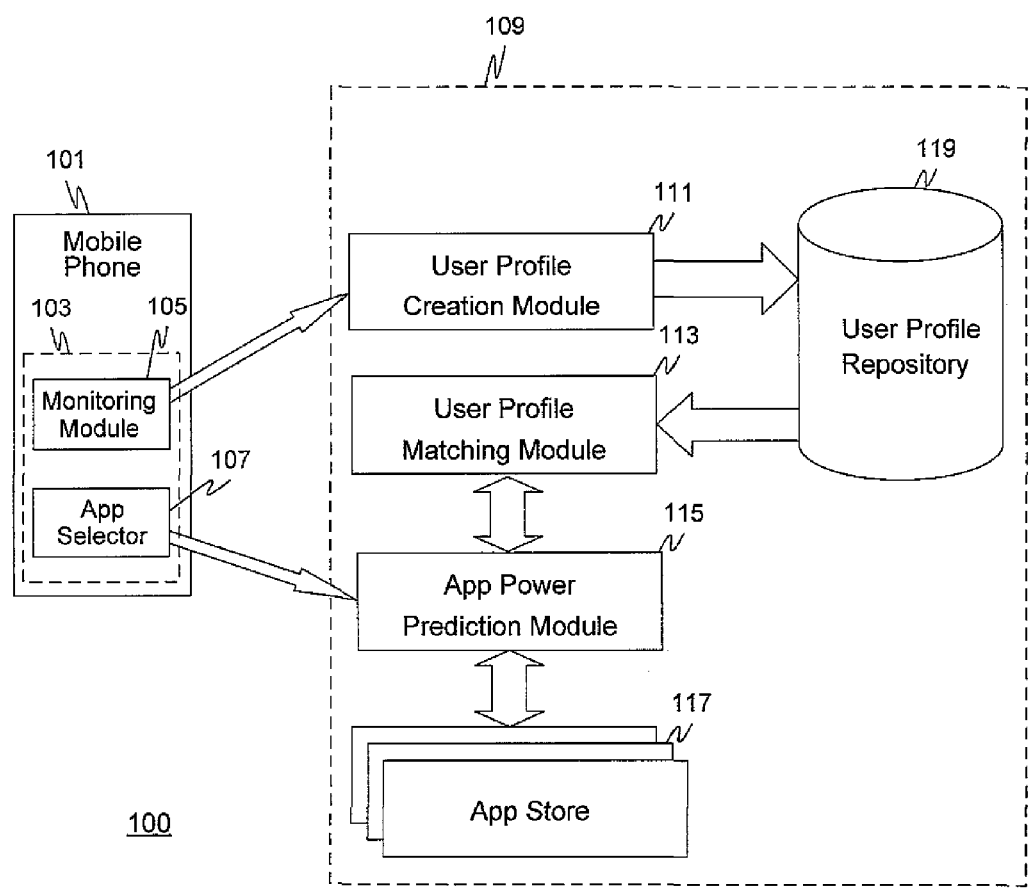
FIG. 1 depicts an overview of a system for predicting the battery drain time due to an application for a portable electronic device such as a smartphone application.

FIG. 1 depicts an overview of a system for predicting the battery drain time due to an application for a portable electronic device such as a smartphone application, according to various embodiments disclosed herein. The figure shows functions that may be performed in various embodiments either in the smartphone 101 or on the system side 109. The various functions—e.g., Module Monitoring 105, App Selector 107, User Profile Creation Module 111, User Profile Matching Module 113, and others—may be implemented in any of several different ways. For example, the functions may be performed by software routines, applets, or other logic such as modules operating either within the smartphone 101 or on the system side 109. The system side 109 may, in some embodiments, be located at one site, e.g., on a server accessed via the Internet. In other embodiments the system side 109 may be distributed among two or more locations, e.g., on different servers accessed via the Internet, with some logic being launched from the mobile system infrastructure itself.

The Monitoring Module 105 and the App Selector 107 are typically stored within a memory of the smartphone 101.

They may be downloaded from the system side 109 through the cellular system telephone links, communicated via another wireless connection of the smartphone 101 such as BlueTooth, or loaded onto a removable memory and inserted into the smartphone 101 itself. The Monitoring Module 105 monitors usage and interaction of the software applications and hardware devices of the smartphone 101. For example, the Monitoring Module 105 may discover that the user makes phone calls 15% of the time the phone is being used, listens to music 35% of the time, and engages in other activities the remaining 50% of the time. The Monitoring Module 105 may also discover that when making telephone calls the user always has the mobile phone's backlight set at a moderately low light level and uses the phone's speakers (e.g., instead using ear buds or a headset). However, when playing music on the smartphone the user generally uses a headset instead of the phone's speakers and often watches music videos, resulting in usage of a great deal of the smartphone's battery resources. The Monitoring Module 105 monitors the user's usage patterns, the mix of hardware features typically enabled (hardware subunits operating concurrently), and the hardware subunits that are typically used by the applications the user tends to use. The data collected by Monitoring Module 105 is stored on the phone at least until such time that it is uploaded to the User Profile Creation Module 111.

The App Selector Module 107 can be used to select an application for the user. The App Selector 107 can provide a list of available applications in various categories of interest to the user. In accordance with various embodiments disclosed herein the App Selector 107, working in conjunction with the App Power Prediction Module 115, can also provide an estimate of the battery drainage impact for each of the applications being considered. This allows the user to make an informed decision in selecting an application for the smartphone 101.

The components of the system side 109 are not generally stored on, or operated from, the smartphone 101. Instead, the system side components are typically located at one or more central sites accessed either via the Internet or via a cellular telephone network. The User Profile Creation Module 111 receives data from Monitoring Module 105 and creates a profile based on the data. The profile will most likely be more useful and accurate if based upon both usage data specific to the user as well as the configuration data of the smartphone 101 hardware and software applications. Once the profile is created it is stored in the User Profile Repository 119. At this point the newly created user profile typically does not include post installation battery drain time of the desired (to be installed) application.

A profile from Repository 119 that matches the user's profile can be selected by the User Profile Matching Module 113 based on configuration information from the mobile phone 101 (e.g., smartphone model, battery type and battery age) and the hardware subunit usage levels. The User Profile Matching Module 113 may do the matching through any or all of closest match or perfect string match on the desired application name;
closest match or perfect string match on the device type and model;
closest match or perfect string match on the battery type; and
the closest match on hardware subunit usage levels wherein the step of finding the closest match can be performed using one of several techniques: absolute thresholding, k-means clustering.

Upon finding the closest matching user profile, the User Profile Matching Module 113 passes it onto the App Power Prediction Module 115 for providing a battery drain time prediction to the user. The App Power Prediction Module 115 predicts the battery drain time by:

retrieving the post-installation battery drain time and the battery age from the matched user profile; and
interpolating the post-installation battery drain time of the matched user profile using the battery age of the matched user profile and the said user profile.

The App Power Prediction Module 115 interacts with the App Store 117 to provide battery drain time prediction for different applications in the app store thereby helping the user to select an appropriate application that most closely suits the user's needs. Further details of a typical mobile phone and a computer suitable for implementing the system are discussed below, in conjunction with FIGS. 4-5.

Figure 2:
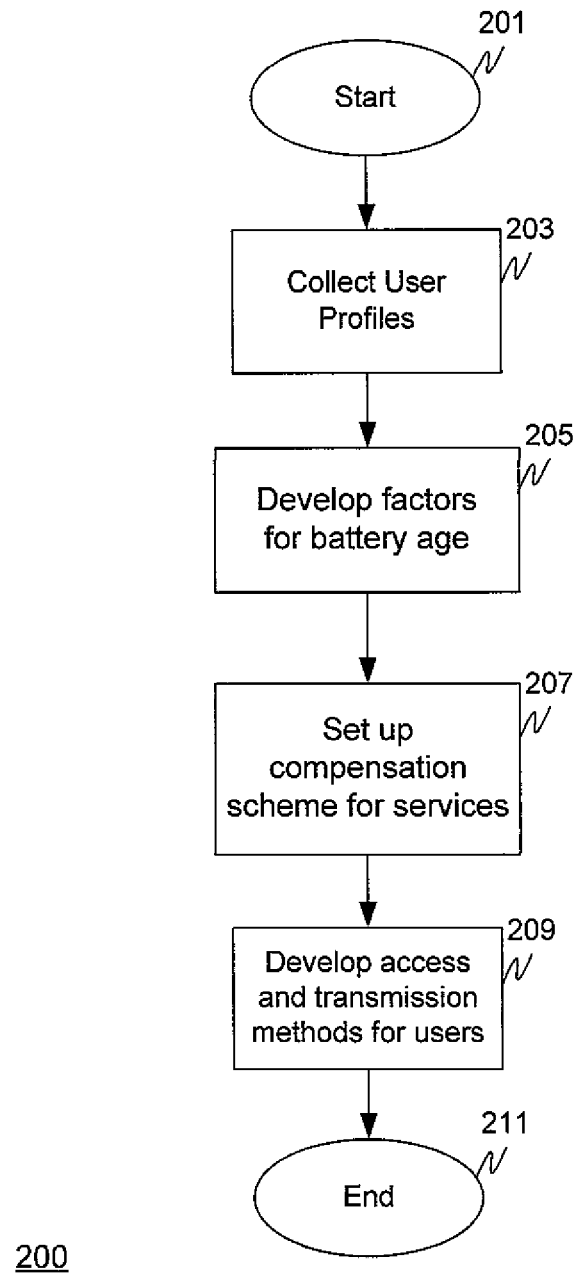
FIG. 2 depicts a method of preliminary activities for preparing the battery drain time prediction system for a smartphone application.

FIG. 2 depicts a method of preliminary activities for preparing the battery drain time prediction system according to various embodiments disclosed herein. The preliminary activities typically entail setting up the system and specifying the parameters, methods and interfaces for practicing the embodiments. Such preliminary activities are generally taken care of before beginning the process of providing power usage monitoring and estimating services to users. However, some of the activities may be ongoing in nature, e.g., the collection of user profiles and data (step 203), or other such steps. Turning to FIG. 2, the method begins at 201 and proceeds to 203 to collect user profiles. Various embodiments collect user profiles over time and store them in a database (e.g., the User Profile Repository 119) for use in providing battery drain time estimates for a given application to be loaded onto a particular type of smartphone with a given battery type and known (or estimated) battery age. For example, when a new user requests an estimate of the battery drain time due to a particular application for the user's smartphone, the system can find a profile in the database for the same type of smartphone with the same battery type and hardware subunits. This enables the system to quickly provide the user with the estimate based on empirical data.

In 203 the user profiles may be collected by detecting the features of the user's mobile phone, or in some instances, by downloading a usage monitor to monitor and record data of the usage habits and battery drain time of the smartphone. For example, in some embodiments when a user first inquires about a battery drain time estimate for an application being considered, the system can detect the current features of the user's smartphone as part of providing the estimate. A usage monitoring service may either be loaded at that time, or in response to the user purchasing the application and loading it on the phone. The usage monitoring service may be implemented in any of several different manners, so long as it monitors the usage habits of the user's mobile phone, e.g., the frequency of usage of various hardware subunits and the combination of hardware subunits used at given times. As an enticement to load the usage monitoring service it may be configured to provide other benefits to the user, such as providing a time estimate to battery depletion if the current usage rate is maintained, the rate of power usage for each active application on the smartphone, or other such information that the user may find informative. The user can download and run the watchdog application to generate a user profile and/or battery drainage profile for their smartphone. This may be done before loading the desired application.

Once a profile is generated it can be uploaded to a profile repository where it is matched with other user profiles stored in the user profile repository. The best match may be selected by comparing the various parameters of the user's smartphone with the set of user profiles that most closely matches the user's profile prior to installation of the desired application. Matching may involve:
- a perfect string match (or closest match) on the desired application name;
- a perfect string match (or closest match) on the device type and model;
- a perfect string match (or closest match) on the battery type; and
- the closest match on hardware subunit usage levels wherein the step of finding the closest match can be performed using one of several techniques: absolute thresholding, k-means clustering.

The post-installation battery drain time and battery age of the closest matching profile is used to predict the battery drain time due to the given application. The post-installation battery drain time of the matched user profile is interpolated using the battery age of the matched user profile and the said user profile to predict the post-installation battery drain time. As the system collects user profiles in 203 they are stored in a database such as the User Profile Repository 119 of FIG. 1.

Turning to block 205, this activity pertains to taking the battery age into consideration, since batteries tend to become less effective at holding a charge over the course of their lifetime. As a battery becomes older it gradually holds less of a charge until it finally fails completely. Therefore, one of the aspects to be modeled is the impact of battery age on its ability to maintain a charge. Since various models of smartphones take different batteries (and some particular models can take more than one battery type), the algorithms take into account the model of the smartphone, the type of battery it takes, and the age of the battery that is installed in the phone. In general, empirical data is used to determine battery depletion. However, the battery depletion predictions and factors may be obtained in any of several other, different manners, as well. For example, predictions and factors may be based on experimental data, may be based on specifications provided by the manufacturer (or by an independent lab), may be based on the design parameters of the battery itself, or the predictions may be based on data collected from users. Other parameters and conditions may be factored into the models, depending upon the particularities of the implementation and the desired sophistication of the model. For example, the charge depletion of a battery may be affected somewhat by the temperature at which the battery is kept during usage, or other such conditions. In some embodiments the factors that affect battery charge are also included as parameters of the model to enhance the accuracy of predicting the battery depletion rate and other relevant aspects of charge depletion.

Once battery age has been considered in 205 the method proceeds to 207 to select the compensation scheme for accessing the database and services of the system. In embodiments with a compensation scheme the user is required to provide something in return for using the services of the system, e.g., for receiving an estimate of battery usage impact for a given smartphone application, or other services such as a battery usage watchdog service, or the like. In some implementations the services of the system may simply be provided free of charge to potential customers of smartphone applications in order to create goodwill with the customers. In other implementations the services may be provided in return for receiving contact information with the understanding that the users' contact information may be provided (sold) to companies in the business of selling smartphone applications, smartphone batteries, or the smartphones themselves. In yet another embodiment the services may be provided in return for a fee from the user, or by deriving revenue from advertisers for Internet banner ads or pop-ups. Once the compensation scheme is decided upon in 207 the method proceeds to 209.

Block 209 involves developing the access interface for users so that they may gain access to the system and the services available for their use. The various embodiments may use multiple access channels to reach potential customers and users. An Internet access portal may be provided on a website allowing a user to request information or services and receive downloads via the Internet. The services can be provided at a point of sale—e.g., a brick and mortar store—at the time the user is either buying (or considering purchase of) a smartphone, a smartphone battery, or an application for the smartphone. A newly purchased smartphone may even come loaded with a sample service, a fully functional version of one or more power usage services, or an application for gaining access to the services, e.g., an icon leading to a website url where the services are available. The services may be delivered in any of several manners as well. They can be downloaded to the user via the Internet, emailed to the user, transmitted by a cellular telephone link or other link (e.g., infrared connection), or loaded directly onto memory using a removable connector cable, plug in card or other hardware access point of the smartphone. Once the distribution channels have been set up in 209 the method proceeds to 211 and ends.

Figure 3:
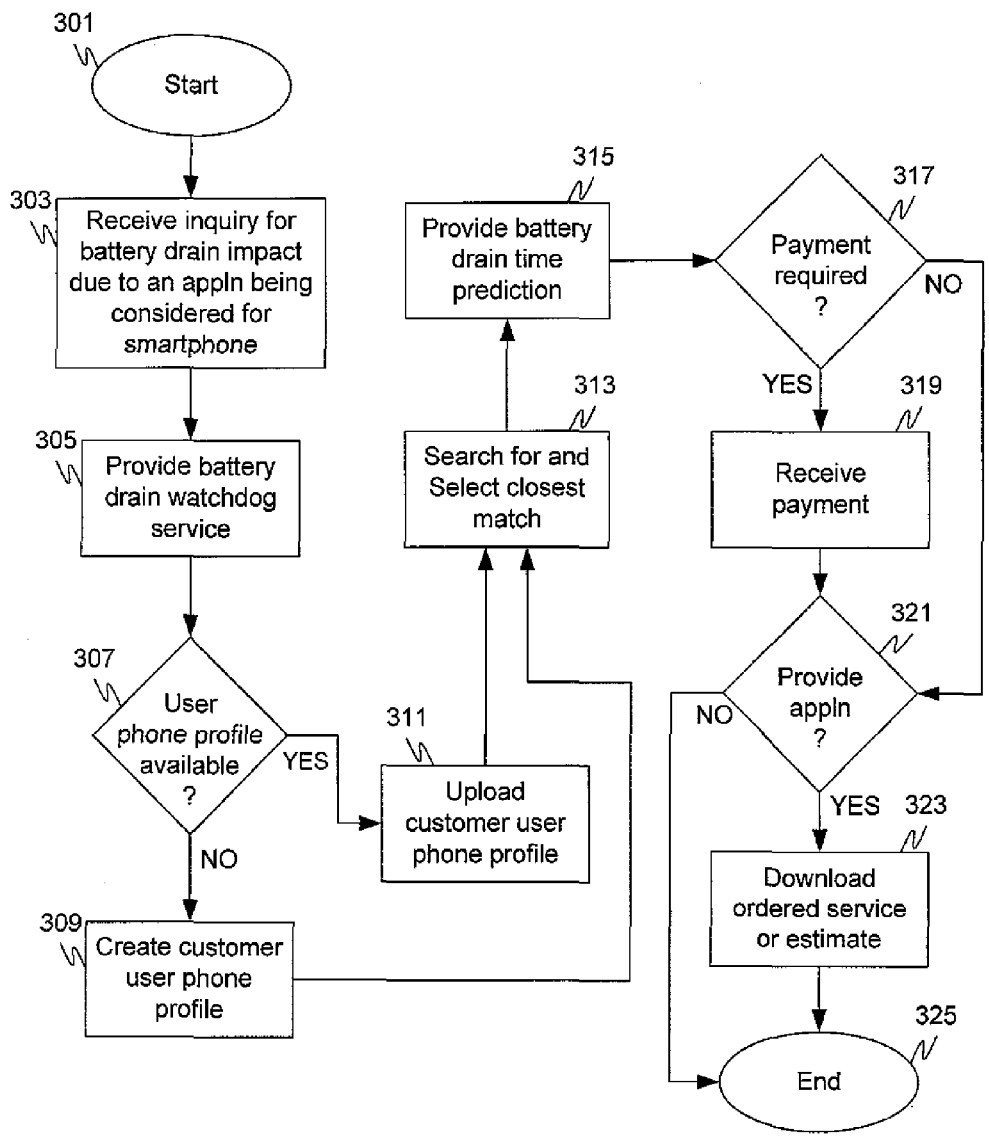
FIG. 3 is the flowchart 300 of a method of for predicting the battery drain time due to an application for a portable electronic device such as a smartphone application.

FIG. 3 is the flowchart 300 of a method for predicting the battery drain time due to an application on a portable electronic device such as a smartphone application, according to various embodiments disclosed herein. The method can provide a user with an estimate or prediction of the battery drain time impact that a particular application would have on the user's smartphone if the user decides to acquire the application. The method begins at 301 and proceeds to 303 where the system receives an inquiry from a user about battery usage. The user may be considering the purchase of an application for their smartphone and want to know what impact the application will have on battery drain time of the smartphone. The inquiry may come in any of several manners, including for instance, via an Internet portal or website operated by the system for the purpose of providing power estimation services to users or other customers. As part of the inquiry the user may be prompted to enter the application being considered for purchase. In some embodiments the user may be provided with the option to enter a category of application (e.g., Road Map application, Restaurant Finder application; Music Player application, or the like). If a category of application is entered the system will provide suggestions for one or more specific applications that suit the user's needs. In 303 the user may also inquire about obtaining a battery monitoring/predicting service from the system rather than only obtaining a battery drain time impact prediction about the particular application of interest at the moment.

Once 303 is completed and the system has received a user inquiry about battery drain time due to an application being considered for the smartphone, the method proceeds to 305 to provide a watchdog service for the user's smartphone. A watchdog service monitors the power usage and/or battery drain and provides an output informing the user of the remaining battery capacity, and in some implementations, the rate of battery drain. In some embodiments a chart of subunit usage can be provided to the user allowing him/her to see the rate at which the various smartphone hardware subunits are draining the battery. This informative tends to be more detailed, and thus more useful, than current battery indicators present on conventional smartphones. Also, battery drain times due to competing applications can be provided to application developers to help them develop power efficient applications. Note that the extra usage of power by our watchdog application is factored in, as all users are using the application. Thus the sensing overhead is taken care of in our system. Upon completing 305 and providing the watchdog application for the user's smartphone the method proceeds to 307.

Block 307 determines whether or not the user's smartphone has an existing profile. It is sometimes the case that the user has inquired before about other applications, or otherwise used the services of the system previously. In such cases a profile may have been set up and stored in the user's smartphone or the user's profile may be stored in a central database of the system. To find an existing profile on the user's smartphone, if any, the system may provide a prompt to the user inquiring about the profile. In other implementations the system may check the smartphone's memory to see whether any profile exists, e.g., check for the profile in a directory area with a predefined name/location or conduct a search of the user's smartphone for the profile. If it is determined in 305 that a profile already exists the method proceeds from 307 along the YES path to 311 to upload the profile from the smartphone. (If the profile already exists within the system's user profile repository then step 311 may be skipped and the method proceeds directly to 313.) The method then proceeds to 313. However, if it is determined back in 307 that a profile has not yet been created for the smartphone the method proceeds from 307 along the NO path to 309 to create a profile for the user's smartphone.

The creation of a profile in 309 for the user's smartphone typically involves the system discovering the type of smartphone the user owns, its battery type, the age of the battery, and the hardware features or subunits the smartphone is equipped with. The user profile may further include a pre-installation battery drain time and a name or unique identifier of the application. In some embodiments the user may provide this information while in other embodiments the system may detect it directly from the smartphone using a special service or software subroutine run on the phone itself. If the information is provided by the user, the user may be prompted to enter the type (or model) of smartphone, and possibly the type and age of battery in the smartphone if the more than one type of battery can be used with the phone. In other implementations the system provides assistance in detecting the applications. For example, the system can send an application detection service to the smartphone either via the Internet, attached to a text message, or in some instances, loaded on a removable disk which is inserted into the smartphone.

Information about the smartphone and its battery may be gathered, for example, once the watchdog application has been installed in block 305, or after an OS (operating system) service is installed on the phone to record information about the hardware subunits (or features) of the smartphone, the battery drain time and usage of the phone's hardware subunits. Typical hardware subunits include the smartphone's backLight, cellular/GSM, radio, disk drive or memory, WiFi, Bluetooth, infra-red, audio subsystem, camera, CPU, and other such units. The usage information may be stored in aggregate measures or in time series of usage. The mix of applications (e.g., software applications) on the smartphone is also typically determined. It should be noted that one usage profile is typically created for the entire phone, and not for each application on the smartphone. The profile may include information about the battery age, the battery drain time (or rate of dissipation), or an actual dissipation profile (e.g., the voltage of the battery at some fixed intervals of time). Upon being executed on the smartphone the application detection service detects the smartphone's applications and communicates this information back to the system, for example, by Internet connection, a text message, or another link such as infrared or a hardwired connection. If the system is not able to discover all the needed information for a complete profile (e.g., because the user declined to provide this information) then the profile will be only a rudimentary one based on the type of smartphone and type of battery. On the other hand, if the system has downloaded an application detection service and has complete information about the smartphone's applications then a more sophisticated and accurate profile will be possible.

Once a profile has been created for the user's smartphone in 309 the method proceeds to 313 to search for, and select, a matching profile in the system profile repository that may be used to provide the battery drain time information requested by the user. The repository, as described above in conjunction with FIG. 2, may be configured in the form of a database containing profiles for different types of smartphones equipped with various battery types and hardware subunits. Block 313 involves searching the database for a smartphone with the same, or similar, attributes as the user's smartphone. For example, the system may select a profile for a smartphone that is the same type as the user's smartphone, containing the same battery type and age, and the same (or similar) mix of hardware subunits. If an exact match is found—that is, if a profile is found in the database for a smartphone of the same predefined type with the correct type of battery at the appropriate age and mix of hardware subunits on it—then that matching profile will be selected in block 313 and the method proceeds to 315.

However in block 313 it may sometimes be the case that the closest matching profile is not an exact match as described above. Since there are a great many permutations of smartphone types and models, and various battery types and hardware features are available, the repository may sometimes not contain an exact matching profile for the user's smartphone. This can occur if the smartphone is a new model for which little data has been collected yet, or simply because the smartphone is an obscure or little used model. In such instances the system may select the profile that is the closest match for the user's smartphone. The closest match may be a profile of a smartphone that is similar to that of the user's smartphone, having many of the same (or similar) hardware subunits as the user's smartphone and possibly the same or similar battery type. The closest match may be based on a comparison of the attributes, for example, using either absolute thresholding or k-means clustering. Once the closest matching profile is selected in 313 the method proceeds to 315.

In block 315 the system determines the battery drain time prediction to be provided to the user. This is done based on the matching profile found for the smartphone in 311, if any, or a closest acceptable match to the profile. Typically, the battery drain time prediction is based on pre-installation battery drain data and post-installation battery drain data of said matching user profile. In this way the impact of installing the application on a smartphone can be accurately determined. The battery drain prediction may be provided to the user in any of several different forms. In its simplest form the prediction may specify a time that the battery charge will be reduced by. For example, the prediction may simply be something like, "Loading application X will reduce the time your battery takes to drain a full charge by 12 minutes." In other implementations the prediction may take a more sophisticated form. For example, the prediction may provide addition information such as, "Loading application X and using it 15% of the time on your smartphone will reduce the time your battery holds a charge by 1%, or approximately 12 minutes." The prediction may also be configured in the form of a table or compilation of data specifying the impact to battery drain for various rates of usage of the application, the battery age, with/without certain hardware features enabled (e.g., backlight on bright vs. dim), or other such applicable parameters affecting battery drain. Some embodiments factor in the age of the battery into the battery drain time prediction. This can be done by retrieving a post-installation battery drain time and battery age from the matching user profile, and interpolating it using the battery age of the matched user profile and the said user profile of the portable electronic device. This provides a more accurate prediction base on the battery age of the user's smartphone battery, since batteries tend to degrade Once the battery drain time prediction has been provided the method proceeds to 317.

In block 317 it is determined whether some sort of payment is required for the services or power usage estimate to be provided by the system. The types of compensation and systems for collecting were discussed above in conjunction with block 207 of FIG. 2. In some embodiments the service may be provided free to the user, with compensation coming instead from the application providers or from advertisers (e.g., in return for banner ads or pop-ups). In other embodiments the services may be provided in return for a fee from the user. If a payment is required the method proceeds from 317 via the "YES" path to 319 to collect the payment from the user, and then on to 321. However, if it is determined in 317 that no payment is to be collected from the user the method proceeds from 317 along the "NO" path to block 321.

Block 321 determines whether or not a service to provide ongoing battery drain estimates, as determined in block 315, is to be provided to the user. It may be the case that no payment was received in 319, or there may be some other reason the system should not provide a battery drain time prediction to the user. In such instances the method proceeds from 321 along the "NO" branch to 325 and ends without providing the user with any sort of battery drain time prediction service. However, if it is determined that such a prediction service is to be provided for the user's smartphone, then the method proceeds from 321 along he "YES" branch to 323 where the prediction is downloaded to the user's smartphone or otherwise provided to the user (e.g., sent as an attachment to a text message, provided in a memory card or dongle-type memory, or other like type of conveying data). Once the prediction has been provided in block 323 the method proceeds to 325 and ends.

Figure 4:
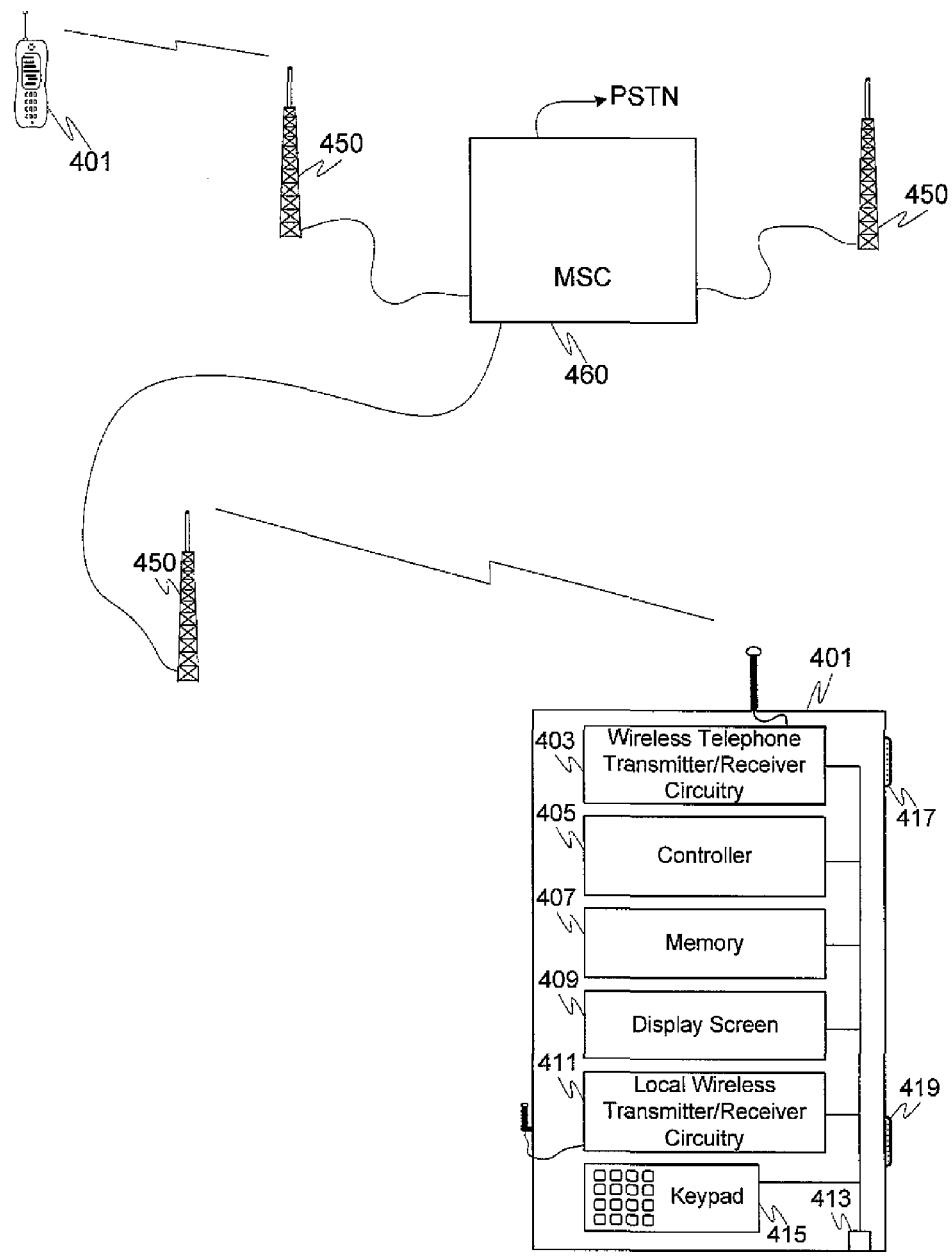
FIG. 4 depicts a block diagram of a smartphone suitable for use in the various embodiments.

FIG. 4 depicts a block diagram of a smartphone 401 suitable for implementing and practicing various embodiments. The various embodiments are described herein in terms of predicting the smartphone battery drain that would be due to loading an application on the smartphone. However, some of the embodiments may be applied to applications for other types of portable electronic devices, including for example, personal digital assistants (PDAs), cellular telephones, portable gaming devices, or even laptop computers. The various embodiments may be applied to yet other devices, so long as they are powered by a battery and capable of loading and executing software applications. However, for the sake of illustration the various embodiments are described as being implemented on a smartphone. Typical features of a smartphone suitable for implementing various embodiments are depicted in FIG. 4.

The smartphone 401 is wirelessly coupled to a base station 450 of the wireless communication system via a wireless communication link. The establishment of a wireless communication link registers the smartphone 401 with the wireless system for communication purposes. For example, the smartphone 401 may register with a Mobile Switching Center (MSC) 460 or other like communication system control point connected to either the public switched telephony network (PSTN) or other type of network such as the Internet. A certain frequency range, timeslot or other measure of a wireless resource may be allocated to the smartphone 401, so as to allow the smartphone 401 to send and receive telephone calls, pages, text messages or data. The smartphone 401 may also be configured to wirelessly connect to other devices through a second, local wireless communications link using the local wireless transmitter/receiver circuitry 411. Typical local wireless links include, for example, Bluetooth, infrared, wi-fi or another short range wireless technology.

The smartphone 401 includes transmitter/receiver circuitry 403 configured to wirelessly send and receive signals to and from a cellular telephone base station 450. The smartphone 401 also includes local wireless transmitter/receiver circuitry 411 configured to wirelessly send and receive short range signals such as Bluetooth, infrared or wi-fi. The memory 407 is configured to store the requisite logic and parameters to control the transmitter/receiver circuitry 403 and 411, access and control the memory 407, and control the other functions of the smartphone 401. The memory 407 is generally integrated as part of the smartphone 401 circuitry, but may, in some embodiments, include a removable memory such as a removable disk memory, integrated circuit (IC) memory, a memory card, or the like. The controller 405 and memory 407 also implement the logic and store the settings, preferences and parameters for the smartphone 401.

The smartphone 401 also has a microphone 419 and speaker 417 for the user to speak and listen to callers. The speaker 417 may represent multiple speakers, at least some of which are configured to alert the user to incoming calls or messages. A keypad 415 is configured as part of smartphone 401 for dialing telephone numbers and entering data. The smartphone 401 may be configured with a data input/output (I/O) port 413 for downloading data, applications, programs and other information. In addition the smartphone 401 typically includes a display screen 409 for displaying messages and information about incoming calls or other features of the smartphone that use a graphic display.

Figure 5:
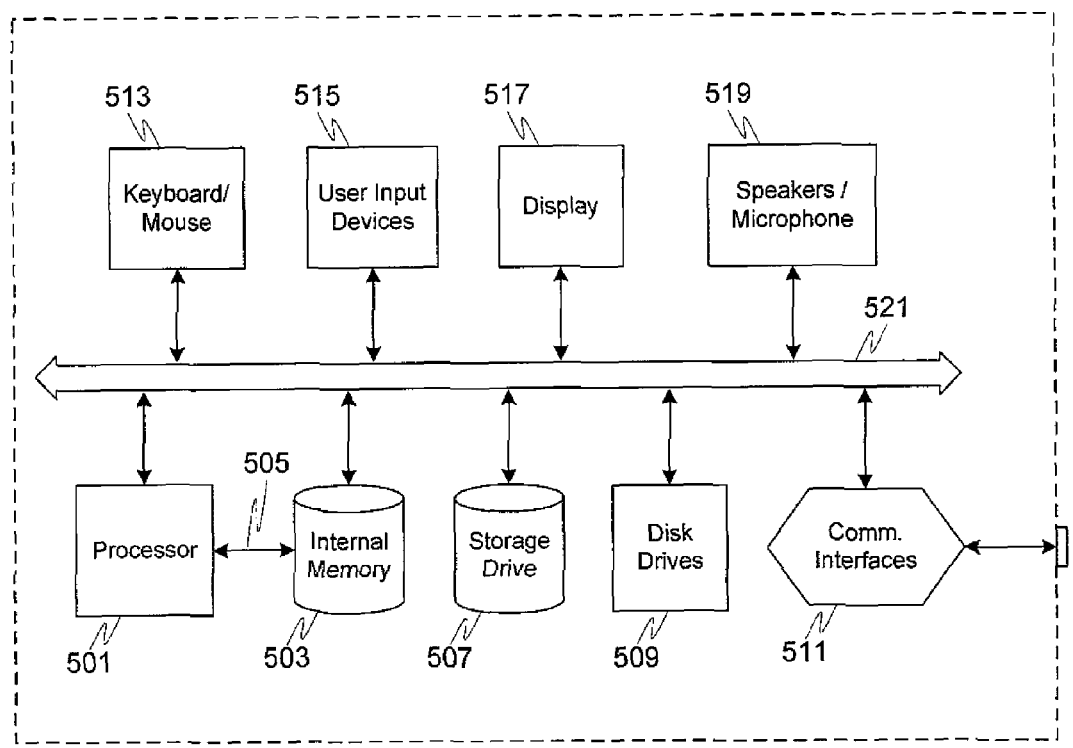
FIG. 5 depicts a computer system suitable for implementing and practicing various embodiments.

FIG. 5 depicts a computer system suitable for implementing and practicing various embodiments. The computer system 500 may be configured in the form of a desktop computer, a laptop computer, a mainframe computer, or any other arrangement capable of being programmed or configured to run a software application, execute code, or otherwise carry out instructions. The components of computer system 500 may be located and interconnected in one location, or may be distributed in various locations and interconnected via communication links such as a local or wide area network (LAN or WAN), via the Internet, via the public switched telephone network (PSTN), or other such communication links. Other devices may also be suitable for implementing or practicing the embodiments, or a portion of the embodiments. Such devices include personal digital assistants (PDA), wireless handsets (e.g., a cellular telephone or pager), and other such consumer electronic devices preferably capable of being programmed to run a software application, execute code, or otherwise carry out instructions.

Computer system 500 includes a processor 501 which may be embodied as a microprocessor, two or more parallel processors, central processing unit (CPU) or other such control logic or circuitry. The processor 501 is configured to access an internal memory 503, generally via a bus such as the system bus 521. The internal memory 503 may include one or more of random access memory (RAM), read-only memory (ROM), cache memory, or a combination of these or other like types of circuitry configured to store information in a retrievable format. In some implementations the internal memory 503 may be configured as part of the processor 501, or alternatively, may be configured separate from it but within the same packaging. The processor 511 may be able to access internal memory 503 via a different bus or control lines (e.g., local bus 505) than is used to access the other components of computer system 500.

The computer system 500 also includes, or has access to, one or more storage drives 507 (or other types of storage memory) and floppy disk drives 509. Storage drives 507 and the floppy disks for floppy disk drives 509 are examples of machine readable (also called computer readable) mediums suitable for storing the final or interim results of the various embodiments. The floppy disk drives 509 may include a combination of several disc drives of various formats that can read and/or write to removable storage media (e.g., CD-R, CD-RW, DVD, DVD-R, floppy disk, or the like). The computer system 500 may either include the storage drives 507 and floppy disk drives 509 as part of its architecture (e.g., within the same cabinet or enclosure and/or using the same power supply), as connected peripherals, or may access the storage drives 507 and floppy disk drives 509 over a network, or a combination of these. The storage drive 507 is often a hard disk drive configured for the storage and retrieval of data, computer programs or other information. The storage drive 507 need not necessarily be contained within the computer system 500. For example, in some embodiments the storage drive 507 may be server storage space within a network that is accessible to the computer system 500 for the storage and retrieval of data, computer programs or other information. In some instances the computer system 500 may use storage space at a server storage farm, or like type of storage facility, that is accessible by the Internet 550 or other communications lines. The storage drive 507 is often used to store the software, instructions and programs executed by the computer system 500, including for example, all or parts of the computer application program for carrying out activities of the various embodiments of the invention.

The computer system 500 may include communication interfaces 511 configured to be communicatively connected to the Internet, a local area network (LAN), a wide area network (WAN), or connect with other devices using protocols such as the Universal Serial Bus (USB), the High Performance Serial Bus IEEE-1394 and/or the high speed serial port (RS-232). The communication interface 511 may be configured to receive various data and information pertaining to embodiments for predicting battery drain time caused by an application for a smartphone, such as receiving the determination of the smartphone type, the battery type and age. The computers system 500 may be connected to the Internet via the wireless router 501, or a wired router or other such access node (not show). The components of computer system 500 may be interconnected by a bus 521 and/or may include expansion slots conforming to any of various industry standards such as PCI (Peripheral Component Interconnect), ISA (Industry Standard Architecture), or EISA (enhanced ISA).

Typically, the computer system 500 includes one or more user input/output devices such as a keyboard and/or mouse 513, or other means of controlling the cursor represented by the user input devices 515 (e.g., touchscreen, touchpad, joystick, trackball, etc.). The communication interfaces 511, keyboard and mouse 513 and user input devices 515 may be used in various combinations, or separately, as means for receiving information and other inputs to be used in carrying out various programs and calculations. A display 517 is also generally included as part of the computer system 500. The display may be any of several types of displays, including a liquid crystal display (LCD), a cathode ray tube (CRT) monitor, a thin film transistor (TFT) array, or other type of display suitable for displaying information for the user. The display 517 may include one or more light emitting diode (LED) indicator lights, or other such display devices. In addition, most computer systems 500 also include, or are connected to, one or more speakers and microphones 519 for audio output and input. Speech recognition software may be used in conjunction with the microphones 519 to receive and interpret user speech commands.

Various activities may be included or excluded as described above, or performed in a different order, while still remaining within the scope of at least one of the various embodiments. For example, the payment of 319 may come ahead of the other steps from a vendor contracting to receive contact information of the user or provide ads along with the application. In such a case the payment may be prearranged in advance and precede the other steps shown in FIG. 3. Other steps or activities of the methods disclosed herein may be omitted or performed in a different manner while remaining within the intended scope of the invention. The method may be implemented through the addition and manipulation of circuitry to a design, hence is applicable for analysis using logic evaluation frameworks such as logic simulators or formal verification algorithms, as well as hardware-based frameworks such as hardware emulators/accelerators and even fabricated chips.

The invention may be implemented with any sort of processing units, processors and controllers (e.g., processor 501 of FIG. 5) capable of performing the stated functions and activities. For example, the processor 501 may be embodied as a microprocessor, microcontroller, DSP, RISC processor, two or more parallel processors, or any other type of processing unit that one of ordinary skill would recognize as being capable of performing or controlling the functions and activities described herein. A processing unit in accordance with at least one of the various embodiments can operate computer software programs stored (embodied) on computer-readable medium such those compatible with the disk drives 509, the storage drive 507 or any other type of hard disk drive, CD, flash memory, ram, or other computer readable medium as recognized by those of ordinary skill in the art.

The computer software programs can aid or perform the steps and activities described above for predicting battery drain time of an application for a portable electronic device containing a battery. For example computer programs in accordance with at least one of the various embodiments may include: source code for predicting battery drain caused by an application for an electronic device containing a battery; source code for determining a device type and device model of the electronic device; source code for determining a battery type and battery age for the battery in the electronic device; source code for determining hardware subunit usage levels for the electronic device; source code for creating a device profile for the electronic device using information determined for the electronic device; source code for selecting a matching user profile by comparing the information determined for the electronic device; and source code for creating a battery drain time prediction for the application based on the matching user profile, wherein the application has yet to be loaded on the portable electronic device at a time of the computing. There are many further source codes that may be written to perform the various steps, activities and procedures disclosed above that are intended to lie within the scope of the various embodiments. Various activities may be included or excluded as described above, or performed in a different order, with the rest of the activities still remaining within the scope of at least one exemplary embodiment.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A method performed by one or more computing devices of predicting battery drain of an electronic device caused by an application for the electronic device containing a battery, the method comprising:
    determining a device type and device model of said electronic device;
    determining a battery type and battery age for the battery in said electronic device;
    determining hardware subunit usage levels for said electronic device;
    creating a user profile using information determined from said electronic device;
    storing the user profile in a user profile repository;
    selecting a matching user profile by comparing the information determined for said electronic device; and
    creating a battery drain time prediction for said application based on the matching user profile;
    wherein the battery drain time prediction is created before loading the application on said electronic device.

2. The method of claim 1, wherein the information determined for said electronic device includes the device type and the device model of said electronic device, the battery type and the battery age for said battery, the hardware subunit usage levels, a pre-installation battery drain time and a name or unique identifier of said application.

3. The method of claim 1, wherein the determining of the hardware subunit usage levels is accomplished by either monitoring the hardware subunit usage levels on said electronic device or by requesting information from a user of said electronic device concerning expected usage levels; and
    wherein said monitoring comprises monitoring the hardware subunit usage levels caused by a mix of applications loaded on said electronic device before the application is loaded on said electronic device.

4. The method of claim 1, wherein the determining of the hardware subunit usage levels for said electronic device comprises determining usage levels for hardware subunits including a CPU, a backlight, a cell/GSM radio, a camera, and an audio subsystem with a microphone and a speaker.

5. The method of claim 3, the monitoring of the hardware subunit usage levels is accomplished by either downloading a watchdog service or by using embedded instrumentation in an operating system running on said electronic device;
    wherein said watchdog service is configured to monitor and store data of the hardware subunit usage levels.

6. The method of claim 1, wherein the matching user profile is selected from a plurality of user profiles in the user profile repository, the selecting further comprising:
    comparing the information determined for said electronic device to comparable categories of information in a plurality of user profiles in the user profile repository.

7. The method of claim 6, wherein the matching user profile is a closest match based on either absolute thresholding, k-means clustering or string matching.

8. The method of claim 1, wherein the battery drain time prediction is based on pre-installation battery drain data and post-installation battery drain data of said matching user profile.

9. The method of claim 1, wherein the creating of said battery drain time prediction further comprises:
    retrieving a post-installation battery drain time and the battery age from the matched user profile;
    interpolating the post-installation battery drain time of the matched user profile using the battery age of the matched user profile and the said user profile.

10. The method of claim 6, wherein the user profile repository is either an on-line repository available via an Internet connection or an off-line storage device, the method further comprising:
    storing the user profile by either connecting to the on-line repository via the Internet using GSM or WiFi interface, or connecting to the off-line storage device using BlueTooth or a USB interface.

11. A software product comprising a non-transitory computer readable medium on which is stored a program of instructions for predicting battery drain caused by an application for an electronic device containing a battery, wherein the program of instructions upon being executed on a computer causes the computer to perform activities comprising:
    determining a device type and device model of said electronic device;
    determining a battery type and battery age for the battery in said electronic device;
    determining hardware subunit usage levels for said electronic device;
    creating a user profile using information determined from said electronic device;
    selecting a matching user profile by comparing the information determined for said electronic device; and
    creating a battery drain time prediction for said application based on the matching user profile;
    wherein the battery drain time prediction is created before loading the application on said electronic device.

12. The software product of claim 11, wherein the information determined for said electronic device includes the device type and the device model of said electronic device, the battery type and the battery age for said battery, the hardware subunit usage levels, a pre-installation battery drain time and a name or unique identifier of said application.

13. The software product of claim 11, wherein the determining of the hardware subunit usage levels is accomplished by either monitoring the hardware subunit usage levels on said electronic device or by requesting information from a user of said electronic device concerning expected usage levels; and
    wherein said monitoring comprises monitoring the hardware subunit usage levels caused by a mix of applications loaded on said electronic device before the application is loaded on said electronic device; and
    wherein the monitoring of the hardware subunit usage levels is accomplished by either downloading a watchdog service or by using embedded instrumentation in an operating system running on said electronic device.

14. The software product of claim 11, wherein the determining of the hardware subunit usage levels for said electronic device comprises determining usage levels for hardware subunits including a CPU, a backlight, a cell/GSM radio, a camera, and an audio subsystem with a microphone and a speaker.

15. The software product of claim 11, wherein the matching user profile is selected from a plurality of user profiles in a user profile repository, the selecting further comprising:
   comparing the information determined for said electronic device to comparable categories of information in a plurality of user profiles in a user profile repository;
   wherein the matching user profile is a closest match based on either absolute thresholding, k-means clustering or string matching.

16. The software product of claim 11, wherein the battery drain time prediction is based on pre-installation battery drain data and post-installation battery drain data of said matching user profile.

17. The software product of claim 11, wherein the creating of said battery drain time prediction further comprises:
   retrieving a post-installation battery drain time and the battery age from the matched user profile;
   interpolating the post-installation battery drain time of the matched user profile using the battery age of the matched user profile and the said user profile.

18. The software product of claim 15, wherein the user profile repository is either an on-line repository available via an Internet connection or an off-line storage device, the method further comprising:
   storing the device profile by either connecting to the on-line repository via the Internet using GSM or WiFi interface, or connecting to the off-line storage device using BlueTooth or a USB interface.

19. A portable electronic device of a given a device type and device model configured to predict battery drain time due to an application for the portable electronic device, said portable electronic device comprising:
   a battery of a given a battery type and battery age;
   a plurality of hardware subunits operating at hardware subunit usage levels;
   memory configured to store a user profile including information determined from said electronic device;
   a CPU configured to execute instructions to create a battery drain time prediction for said application based on a matching user profile selected by comparing the information determined for said electronic device; and
   a display screen configured to display the battery drain time prediction;
   wherein the battery drain time prediction is created before loading the application on said electronic device.

20. The portable electronic device of claim 19, wherein the information determined for said electronic device includes the device type and the device model of said electronic device, the battery type and the battery age for said battery, the hardware subunit usage levels, a pre-installation battery drain time and a name or unique identifier of said application.

* * * * *